United States Patent
Ding et al.

(10) Patent No.: US 10,664,349 B2
(45) Date of Patent: May 26, 2020

(54) METHOD AND DEVICE FOR FILE STORAGE

(71) Applicant: Hangzhou Hikvision Digital Technology Co., Ltd., Hangzhou, Zhejiang (CN)

(72) Inventors: Zhiyong Ding, Zhejiang (CN); Qiqian Lin, Zhejiang (CN); Wei Chen, Zhejiang (CN); Li Cao, Zhejiang (CN)

(73) Assignee: Hangzhou Hikvision Digital Technology Co., Ltd., Hangzhou, Zhejiang (CN)

( * ) Notice: Subject to any disclaimer, the term of this patent is extended or adjusted under 35 U.S.C. 154(b) by 0 days.

(21) Appl. No.: 16/337,632

(22) PCT Filed: Sep. 13, 2017

(86) PCT No.: PCT/CN2017/101642
§ 371 (c)(1),
(2) Date: Mar. 28, 2019

(87) PCT Pub. No.: WO2018/059239
PCT Pub. Date: Apr. 5, 2018

(65) Prior Publication Data
US 2020/0034238 A1 Jan. 30, 2020

(30) Foreign Application Priority Data
Sep. 28, 2016 (CN) .......................... 2016 1 0856834

(51) Int. Cl.
*G06F 16/10* (2019.01)
*G06F 11/14* (2006.01)
*G06F 3/06* (2006.01)

(52) U.S. Cl.
CPC .......... *G06F 11/1435* (2013.01); *G06F 3/064* (2013.01); *G06F 3/067* (2013.01); *G06F 11/1469* (2013.01); *G06F 16/10* (2019.01)

(58) Field of Classification Search
CPC ...... G06F 16/10; G06F 11/14; G06F 11/1435; G06F 11/1469; G06F 3/064; G06F 3/067
(Continued)

(56) References Cited

U.S. PATENT DOCUMENTS 8,631,052 B1   1/2014  Shilane et al.
2006/0129614 A1  6/2006  Kim et al.

FOREIGN PATENT DOCUMENTS

CN   102110146 A   6/2011
CN   103186668 A   7/2013
(Continued)

OTHER PUBLICATIONS

Stender et al. "BabuDB: Fast and Efficient File System Metadata Storage." International Workshop on Storage Network Architecture and Parallel I/Os. 2010, 51-58.

*Primary Examiner* — Hashem Farrokh
(74) *Attorney, Agent, or Firm* — Bret E. Field; Bozicevic, Field & Francis LLP

(57) ABSTRACT

A file storage method and device are provided. The method includes: receiving a storage request for a to-be-stored file (S101); determining a target key for storing the to-be-stored file (S102); obtaining to-be-stored metadata of the to-be-stored file according to the determined target key (S103), wherein the to-be-stored metadata includes: fixed sub-metadata and variable sub-metadata; and storing the to-be-stored metadata in a metadata database, storing the fixed sub-metadata in a name of the determined target key, storing the variable sub-metadata in a preset storage area corresponding to the determined target key, and storing the to-be-stored file in a value of the determined target key (S104). By applying (Continued)

the file storage and device, the recovery of metadata is effectively ensured, while a storage space of a storage terminal is saved.

14 Claims, 3 Drawing Sheets

(58) Field of Classification Search
 USPC .......................................................... 711/100
 See application file for complete search history.

(56) References Cited

FOREIGN PATENT DOCUMENTS

| | | |
|---|---|---|
| CN | 104408091 A | 3/2015 |
| CN | 105069048 A | 11/2015 |
| CN | 105354315 A | 2/2016 |

METHOD AND DEVICE FOR FILE STORAGE

The application claims the priority to Chinese patent application No. 201610856834.1, filed with the China National Intellectual Property Administration on Sep. 28, 2016 and entitled "METHOD AND DEVICE FOR FILE STORAGE", which is incorporated herein by reference in its entirety.

TECHNICAL FIELD

The application relates to the field of data processing, and in particular to a file storage method and system.

BACKGROUND

With the development of network technology, people often uploads a file to a network location, that is, the file is stored in a network hard disk of a storage server, i.e. IP (Internet Protocol) hard disk, which saves a storage space of a local client and avoids the loss of file. Here, the storage server includes at least one IP hard disk, one of which corresponds to multiple keys; one stripe corresponds to multiple keys, and one stripe may correspond to one or more IP hard disks; one key only stores one file, and one file can be stored in multiple keys.

At present, when a file is stored, the metadata of the file needs to be stored. As such, when there is a data access requirement, the storage server obtains the file according to the metadata. Here, the metadata may include: sub-metadata corresponding to file information such as a file name, an identifier of a domain in which a key is located, an offset of data stored in the key in the file, a length of data stored in the key and the like, and sub-metadata corresponding to stripe information such as a stripe identifier and the number of a key in the stripe. The sub-metadata corresponding to the file information is constant, and the sub-metadata corresponding to the stripe information may change. For example, after the storage server deletes files, strips corresponding to the deleted files may be recycled. However, the recycled strips may additionally correspond to files that are not deleted. In this case, other stripes will be assigned to these files that are not deleted, resulting in the change of the sub-metadata corresponding to the stripe information.

After the metadata is lost, even if the data of the file is read, it is not possible to distinguish which file the read data belongs to, thereby causing the loss of the file.

In order to avoid the loss of the file, the file is usually stored by the following method for backing up metadata.

When a file is stored, the metadata of the file is stored in a metadata database, and then the metadata of the file is stored in a backup metadata database. When the metadata in the metadata database is lost, the lost metadata in the metadata database is recovered by the metadata in the backup metadata database, avoiding the loss of the file. In this way, although the security of the metadata is enhanced and the recovery of the metadata in the metadata database can be ensured, additional storage space is needed to store the metadata in the backup metadata database.

It can be seen from the above that in order to avoid the loss of file and ensure that the lost metadata can be recovered, additional storage space is required, which reduces the effective utilization of the storage space.

SUMMARY

The present application discloses a file storage method and device, which saves storage space while ensuring the recovery of metadata.

To achieve the above objective, an embodiment of the present application discloses a file storage method, including:

receiving a storage request for a to-be-stored file;

determining a target key for storing the to-be-stored file;

obtaining to-be-stored metadata of the to-be-stored file according to the determined target key, wherein the to-be-stored metadata comprises: fixed sub-metadata and variable sub-metadata; and storing the to-be-stored metadata in a metadata database, storing the fixed sub-metadata in a name of the determined target key, storing the variable sub-metadata in a preset storage area corresponding to the determined target key, and storing the to-be-stored file in a value of the determined target key.

Optionally, in the event that the determined target key is a plurality of keys, before obtaining the to-be-stored metadata of the to-be-stored file according to the determined target key, the method further comprises:

obtaining, according to the number of the determined target keys, a file block of the to-be-stored file which is to be stored by each target key; and the step of obtaining to-be-stored metadata of the to-be-stored file according to the determined target key comprises:

obtaining metadata of a file block to be stored by each target key, and determining the obtained metadata as to-be-stored metadata of the to-be-stored file.

Optionally, the step of obtaining metadata of a file block to be stored by each target key comprises:

determining an offset of a file block to be stored by each target key relative to a file header of the to-be-stored file, and determining stripe information corresponding to each target key; and for each target key, obtaining first fixed sub-metadata of the file block to be stored by this target key according to the offset of the file block to be stored by this target key relative to the file header of the to-be-stored file, and obtaining first variable sub-metadata of the file block to be stored by this target key according to the stripe information corresponding to this target key, wherein the first fixed sub-metadata and the first variable sub-metadata constitute the metadata of the file block to be stored by this target key; and the step of storing the fixed sub-metadata in the name of the determined target key and storing the variable sub-metadata in the preset storage area corresponding to the determined target key comprises:

for each target key, storing the first fixed sub-metadata in the name of this target key, and storing the first variable sub-metadata in the preset storage area corresponding to this target key.

Optionally, after storing the to-be-stored metadata in the metadata database, storing the fixed sub-metadata in a name of the determined target key, storing the variable sub-metadata in the preset storage area corresponding to the determined target key, and storing the to-be-stored file in a value of the determined target key, the method further comprises:

in the event that the loss of metadata occurs in the metadata database, updating the metadata database according to fixed sub-metadata stored in names of all the keys and variable sub-metadata stored in preset storage areas.

Optionally, the step of updating the metadata database according to fixed sub-metadata stored in names of all the keys and variable sub-metadata stored in preset storage areas, comprises:

obtaining an identifier of a file whose metadata is lost;

determining a key containing the obtained identifier according to the obtained identifier and the fixed sub-metadata stored in the names of all the keys; and updating the metadata database according to fixed sub-metadata stored in the name of the determined key and variable sub-metadata stored in a preset storage area corresponding to the determined key.

Optionally, when a stripe for a first key is recycled, the method further includes:

acquiring new stripe information corresponding to the first key;

obtaining, according to the new stripe information, second variable sub-metadata of a file stored in the first key; and updating variable sub-metadata stored in a preset storage area corresponding to the first key according to the second variable sub-metadata In order to achieve the above objective, an embodiment of the present application further discloses a file storage device, including:

a receiving unit, configured for receiving a storage request for a to-be-stored file;

a determining unit, configured for determining a target key for storing the to-be-stored file;

a first obtaining unit, configured for obtaining to-be-stored metadata of the to-be-stored file according to the determined target key, wherein the to-be-stored metadata comprises: fixed sub-metadata and variable sub-metadata; and a storage unit, configured for storing the to-be-stored metadata in a metadata database, storing the fixed sub-metadata in a name of the determined target key, storing the variable sub-metadata in a preset storage area corresponding to the determined target key, and storing the to-be-stored file in a value of the determined target key.

Optionally, the device further includes:

a second obtaining unit, configured for, when the determined target key is a plurality of keys, obtaining, according to the number of the determined target keys, a file block of the to-be-stored file which is to be stored by each target key, before the to-be-stored metadata of the to-be-stored file is obtained according to the determined target keys; and the first obtaining unit is further configured for:

obtaining metadata of a file block to be stored by each target key, and determining the obtained metadata as to-be-stored metadata of the to-be-stored file.

Optionally, the first obtaining unit includes:

a first determining subunit, configured for determining an offset of a file block to be stored by each target key relative to a file header of the to-be-stored file, and determining stripe information corresponding to each target key; and a first obtaining subunit, configured for, for each target key, obtaining first fixed sub-metadata of the file block to be stored by this target key according to the offset of the file block to be stored by this target key relative to the file header of the to-be-stored file, and obtaining first variable sub-metadata of the file block to be stored by this target key according to the stripe information corresponding to this target key, wherein the first fixed sub-metadata and the first variable sub-metadata constitute the metadata of the file block to be stored by this target key; and the storage unit is further configured for:

for each target key, storing the to-be-stored metadata in the metadata database, storing the first fixed sub-metadata in the name of this target key, storing the first variable sub-metadata in the preset storage area corresponding to this target key, and storing the to-be-stored file in the value of this target key.

Optionally, the device further includes:

an updating unit, configured for updating the metadata database according to fixed sub-metadata stored in names of all the keys and variable sub-metadata stored in preset storage areas, in the event that the loss of metadata occurs in the metadata database.

Optionally, the updating unit includes:

a second obtaining subunit, configured for obtaining an identifier of a file whose metadata is lost, in the event that the loss of metadata occurs in the metadata database;

a second determining subunit, configured for determining a key containing the obtained identifier according to the obtained identifier and the fixed sub-metadata stored in the names of all the keys; and an updating subunit, configured for updating the metadata database according to fixed sub-metadata stored in the name of the determined key and variable sub-metadata stored in a preset storage area corresponding to the determined key.

Optionally, the device further includes:

an acquiring unit, configured for acquiring new stripe information corresponding to a first key when a stripe for the first key is recycled;

a third obtaining unit, configured for obtaining, according to the new stripe information, second variable sub-metadata of a file stored in the first key; and an updating unit, configured for updating variable sub-metadata stored in a preset storage area corresponding to the first key according to the second variable sub-metadata.

To achieve the above objective, an embodiment of the present application discloses an electronic device including a processor, a communication interface, a memory, and a communication bus; wherein the processor, the communication interface, and the memory communicates with each other via the communication bus;

the memory is configured to store an application program; and the processor, when executing the application program stored on the memory, implements the above file storage method.

To achieve the above objective, an embodiment of the present application discloses an application program which implements the above file storage method when being executed.

To achieve the above objective, an embodiment of the present application discloses a readable storage medium for storing an application program which, when executed, implements the above file storage method.

In the embodiments of the present application, after a storage request for a to-be-stored file is received, to-be-stored metadata of the to-be-stored file is obtained. While the to-be-stored metadata is stored in the metadata database, the fixed sub-metadata in the to-be-stored metadata is stored in the name of the determined target key, and the variable sub-metadata in the to-be-stored metadata is stored in the preset storage area corresponding to the determined target key. In this way, in the case that the loss of metadata occurs in the metadata database, the metadata in the metadata database can be recovered according to the fixed sub-metadata stored in the name of the key and the variable sub-metadata in the preset storage area corresponding to the key, thus ensuring the recovery of metadata. In addition, the fixed sub-metadata is stored in the fixed storage space occupied by the name of the key, thus the fixed sub-metadata does not occupy additional storage space, thereby saving storage space.

BRIEF DESCRIPTION OF THE DRAWINGS

In order to more clearly describe the technical solutions of the embodiments of the present application or of the prior art, drawings that need to be used in embodiments and the prior art will be briefly described below. Obviously, the drawings provided below are for only some embodiments of the present application; those skilled in the art can also obtain other drawings based on these drawings without any creative efforts.

DETAILED DESCRIPTION

The technical solutions of the present application will be described in more detail below with reference to the appended drawings and embodiments. Obviously, the described embodiments are only some, and not all, of the embodiments of the present application. All other embodiments obtained based on the embodiments of the present application by those skilled in the art without any creative efforts fall into the scope of protection defined by the present application.

The present application will be described in detail below through specific embodiments.

Figure 1:
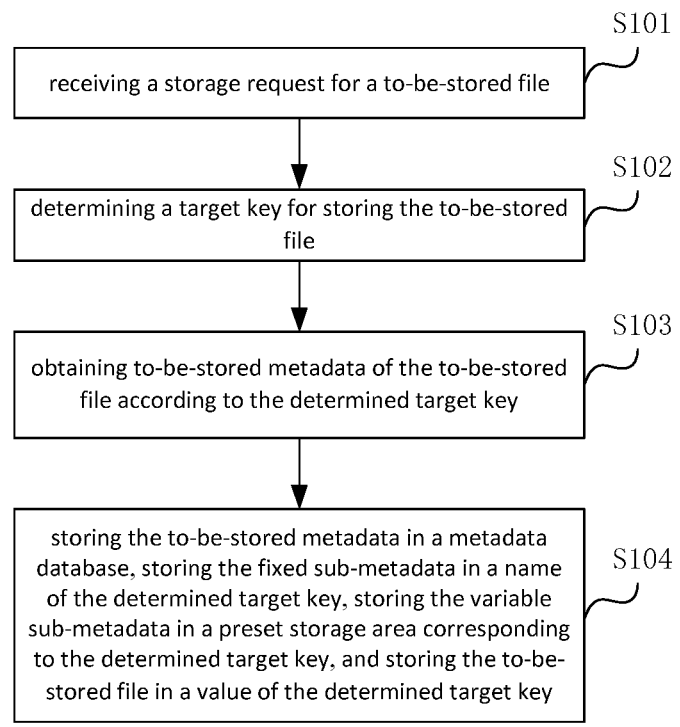
FIG. 1 is a schematic flowchart of a file storage method according to an embodiment of the present application.

FIG. 1 is a schematic flowchart of a file storage method according to an embodiment of the present application. The method includes S101-S104.

S101: Receiving a storage request for a to-be-stored file.

Here, the storage request contains the to-be-stored file. The storage request may also contain an identifier of the to-be-stored file, so that the identifier of the to-be-stored file can be quickly obtained. Alternatively, the storage request may not contain the identifier of the to-be-stored file, and at this time, the identifier of the to-be-stored file may be obtained by parsing the to-be-stored file. In this case, the storage request is simpler and clearer.

S102: Determining a target key for storing the to-be-stored file.

In an implementation of the present application, the massive data storage with high reliability and scalability will be a huge challenge for the existing storage device, and the traditional database is often difficult to meet the requirement of the massive data storage. Under the circumstances, it would be a good choice to use a key for storage. The storage by key has the following advantages:

1. Availability;
2. Scalability;
3. Failover; and
4. High Performance

A key consists of a name Key and a value Value, and storage spaces occupied by the Key and Value are fixed.

In an implementation of the present application, after the storage request for the to-be-stored file is received, an idle key can be searched for backward from the end storage location, i.e., a storage location where the last data storage is performed. When an idle key is found, the idle key is used as a target key, and the data of the to-be-stored file is stored in the target key. When the target key is full, if the entire to-be-stored file has been not stored completely, an idle key continues to be searched for backward until the entire to-be-stored file is stored in the keys.

Assuming that a data volume D1 that can be stored by the value of each key is fixed, since a data volume D2 of a to-be-stored file is not fixed, when the data volume D2 of the to-be-stored file is larger than the data volume D1 that can be stored by a value of a key, 2, 3 or more target keys will be required to store the to-be-stored file.

In an embodiment of the present application, the number of the required target keys can be calculated according to the data volume of the to-be-stored file and the data volume that can be stored by the value of the key. Specifically, the data volume D2 of the to-be-stored file is divided by the data volume D1 that can be stored by the value of each key, and the quotient of D2 and D1 is obtained; then the number of the required target keys can be obtained by taking the integer portion of the obtained quotient and then adding the integer portion by 1. For example, if the data volume D2 of the to-be-stored file is 1.2M, and the data volume D1 that can be stored by the value of each key is 1M, 1.2/1=1.2; then it can be determined that the number of the keys required to store the to-be-stored file is 2 by taking the integer portion (i.e. 1) of 1.2 and then adding the integer portion by 1.

After the number of target keys is determined, the target keys for storing the to-be-stored file can be further determined. In an implementation of the present application, an idle key can be searched for backward from the end storage location (i.e., a storage location where the last data storage is performed), as the target key, and the total number of the idle keys that should be found is equal to the determined number of the target keys. Assuming that there are 5 keys, which are a, b, c, d, e, wherein between any two adjacent keys, the former key is ahead of the latter key in location. If after the last data storage is performed, the end storage location is the key a, the key c has stored data, and the determined number of the target keys is 2, then the idle keys are searched for backward from the key a, and thus the target keys can be determined to be b and d.

S103: Obtaining to-be-stored metadata of the to-be-stored file according to the determined target key.

After the target key is determined, the storage location of the to-be-stored file is determined. The storage location may include: an identifier of a stripe corresponding to the target key, a serial number of the target key in the stripe, and an identifier of the domain where the target key is located, and the like. The metadata of the to-be-stored file, which is also the to-be-stored metadata, may be obtained according to the storage location of the to-be-stored file, as well as file information such as the identifier of the to-be-stored file, the offset of the data stored in the key in the file, and the length of the data stored in the key. The metadata of the to-be-stored file includes: fixed sub-metadata and variable sub-metadata. Specifically, the fixed sub-metadata includes sub-metadata corresponding to file information such as a file name, an identifier of a domain in which the key is located, and an offset of data stored in the key in the file, and the length of the data stored in the key. The variable submetadata includes sub-metadata corresponding to stripe information such as an identifier of the stripe and the serial number of the key in the stripe.

Figure 2:
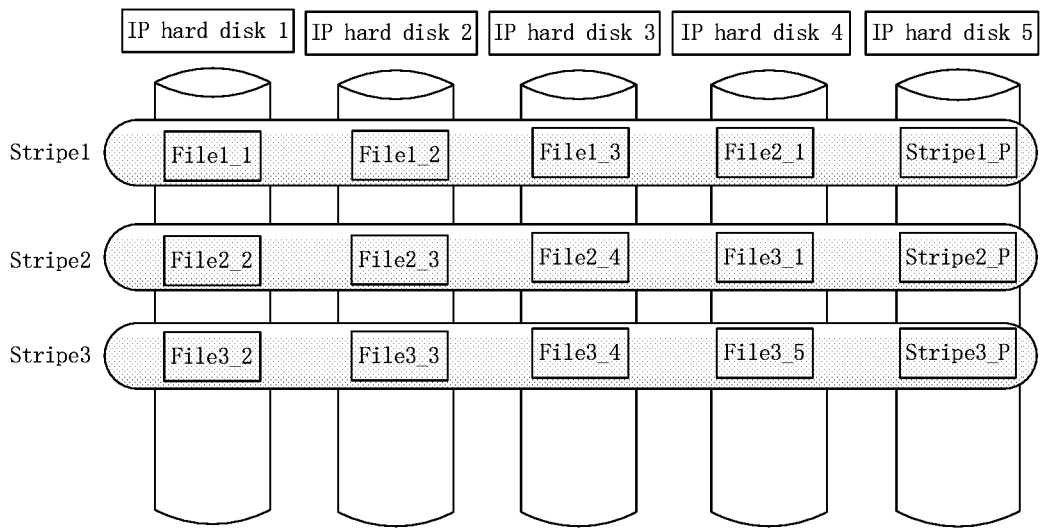
FIG. 2 is a schematic diagram of a file storage according to an embodiment of the present application.

One stripe corresponds to multiple keys. One key corresponds to one stripe. One key stores only one file, but one file can be stored in multiple keys. As shown in FIG. 2, stripe 1, i.e., Stripe1, corresponds to the keys storing File1_1, File1_2, File1_3, File2_1, and Stripe1_P; stripe 2, i.e., Stripe2, corresponds to the keys storing File2_2, File2_3, File2_4, File3_1, and Stripe2_P; and stripe 3, i.e., Stripe3, corresponds to the keys storing File3_2, File3_3, File3_4, File3_5, and Stripe3_P.

In an implementation of the present application, in the case that the target key for storing the to-be-stored file includes a plurality of keys, before the to-be-stored metadata of the to-be-stored file is obtained according to the determined target key, a file block of the to-be-stored file, which is to be stored by each target key, is obtained according to the determined number of target keys.

Here, one target key corresponds to one file block, and the file block is a piece of data of the to-be-stored file. That is, one target key corresponds to a piece of data of the to-be-stored file. For example, if the data volume of a to-be-stored file is 1M and the number of target keys is 2, then two file blocks of the to-be-stored file can be obtained, with the data volume of each file block being 0.5M. That is, each target key corresponds to 0.5M of data of the to-be-stored file. In an implementation of the present application, when the file blocks of the to-be-stored file are obtained, each file block does not necessarily have the same size. For example, after target keys for storing a to-be-stored file is determined, a plurality of file blocks having a data volume of D3 are sequentially obtained from the to-be-stored file, such as file blocks A, B and so on. D3 is the volume of data that can be stored in each target key. If the data volume of the last obtained file block C is smaller than the data volume D3, then the file block C can be directly determined as a file block corresponding to a target key.

Assuming that the data volume of the to-be-stored file is 1.2M and the data volume that can be stored in each target key is 1M, it can be determined that the number of target keys is 2. Two idle keys are searched for backward from the key for the last data storage, as the target keys. Assuming that the names of the two found idle keys are Key1 and Key2, respectively, the file block with data volume of 1M corresponding to the key whose name is Key1 and the file block with data volume of 0.2M corresponding to the key whose name is Key2 can be obtained from the to-be-stored file. That is, the file block with data volume of 1M is first obtained from the to-be-stored file and is stored in the key whose name is Key1, and then the file block with data volume of 0.2M is obtained and is stored in the key whose name is Key2.

In an implementation of the present application, the to-be-stored file may be directly segmented into a plurality of file blocks according to the number of the target keys, wherein the number of the file blocks is equal to the number of target keys, and the data volume of each file block is not greater than the data volume that can be stored in each target key. In this case, the file blocks can be directly obtained and stored in the corresponding target keys.

In an implementation of the present application, when data is to be stored in one target key, one file block is segmented from the to-be-stored file, which will be stored in the target key. The data volume of the file block is not greater than the data volume that can be stored by each target key.

Assume that the data volume of the to-be-stored file is 2.4M, and the data volume that can be stored in each target key is 1M. An idle key can be searched for backward from the key for the last data storage, as the target key. For example, an idle key whose name is Key1 is found. A file block f1 with data volume of 1M is segmented from the to-be-stored file and is stored into the idle key whose name is Key1. Then, an idle key continues to be searched for backward. For example, an idle key whose name is Key2 is found. A file block f2 with data volume of 1M is segmented from the to-be-stored file and is stored in the idle key whose name is Key2. Then, an idle key continues to be searched for backward. For example, an idle key whose name is Key3 is found. At this time, the remaining 0.4M data is used as a file block f3 and the file block f3 is stored in the idle key whose name is Key3.

In an implementation of the present application, the step of obtaining to-be-stored metadata of the to-be-stored file according to the determined target key may include:

obtaining metadata of a file block to be stored by each target key, and determining the obtained metadata as the to-be-stored metadata of the to-be-stored file.

Specifically, in the case that the determined target key includes a plurality of keys, the to-be-stored file is stored in the plurality of keys in the form of file block. Each file block corresponds to a specific storage location, and storage locations of respective file blocks may be or may not be contiguous. In addition, since the offset of each file block relative to the file header of the to-be-stored file is different, the to-be-stored metadata of the to-be-stored file includes not only the storage location information of each file block, but also the offset information of the file block relative to the file header of the to-be-stored file, so that after all file blocks of the file are read out from the storage device, the file blocks can be correctly combined to obtain the complete file.

In addition, since the file block is a part of the to-be-stored file, metadata of the file block stored in the value of each target key can be obtained as a part of the to-be-stored metadata of the to-be-stored file. The metadata of all the file blocks in the to-be-stored file constitutes the complete to-be-stored metadata in the to-be-stored file.

It should be noted that the metadata of the file block may include: an identifier of the to-be-stored file to which the file block belongs, an identifier of a domain in which the file block is stored, an offset of the file block in the to-be-stored file, a data volume of the file block, an identifier of the stripe corresponding to the key in which the file block is located, and the serial number of the key in which the file block is located in the stripe.

The identifier of the domain in which the file block is stored is an additional attribute of the to-be-stored file in the storage server. Each storage server includes multiple domains, and one domain may also include multiple storage servers. The file block of the to-be-stored file may be stored in several domains. With the identifier of the domain in which the file block is stored, the file block can be obtained more accurately and quickly when the file is read. In addition, the offset of the file block in the to-be-stored file is the offset of the file block relative to the file header of the to-be-stored file. For example, the offset of the file block stored in the value of the key whose name is Key2 in the to-be-stored file is 1M. Further, the storage server manages file blocks stored in a key by means of a stripe. As shown in FIG. 2, each key corresponds to one stripe, and one strip includes keys for storing file blocks, such as a key for storing File1_1, a key for storing File2_1, and a key for storing check data, such as a key for storing Stripe1_P, a key for storing Stripe2_P, and a key for storing Stripe3_P. In this way, when a file block in a key J cannot be read normally, an Erasure Code (EC) can be calculated by file blocks and check data stored in other keys in the stripe corresponding to the key, so as to reconstruct the file block in key J.

In an implementation of the application, the step of obtaining metadata of a file block to be stored in each target key may include the following steps.

S01. Determining an offset of a file block to be stored by each target key relative to a file header of the to-be-stored file, and determining stripe information corresponding to each target key.

In an implementation of the present application, the step of determining an offset of a file block to be stored by each target key relative to a file header of the to-be-stored file may include:

calculating an offset of a file block F to be stored by a target key X relative to a file header of the to-be-stored file, wherein the target key X is any one of a plurality of target keys for the to-be-stored file.

The offsets of the file blocks relative to the file header of the to-be-stored file are also parts of the to-be-stored metadata of the to-be-stored file. After the offsets are stored, in reading the file, the file blocks of the file can be accurately obtained according to the offsets, and the file blocks which are stored in a plurality of keys and belong to the same file can be combined in a correct order to form a complete and correct file.

S02. For each target key, obtaining first fixed sub-metadata of the file block to be stored by this target key according to the offset of the file block to be stored by this target key relative to the file header of the to-be-stored file, and obtaining first variable sub-metadata of the file block to be stored by this target key according to the stripe information corresponding to this target key, wherein the first fixed sub-metadata and the first variable sub-metadata constitute the metadata of the file block to be stored by this target key.

In an implementation of the present application, after determining the offset of the file block F relative to the file header of the to-be-stored file, the first fixed sub-metadata of the file block F to be stored in the value of the target key X is obtained based on the metadata information, such as the identifier of the to-be-stored file, the data volume of the file block F, and the identifier of the domain where the device storing the file block F is located; and the first variable sub-metadata of the file block F to be stored by the target key X is obtained based on the stripe information corresponding to the target key X, such as the identifier of the stripe and the serial number of the target key X in the stripe. The first fixed sub-metadata and the first variable sub-metadata are combined to form the metadata of the file block to be stored in the target key X.

S104: Storing the to-be-stored metadata to the metadata database, storing the fixed sub-metadata in a name of the determined target key, storing the variable sub-metadata into a preset storage area corresponding to the determined target key, and storing the to-be-stored file in a value of the determined target key.

Here, the metadata database is used to store metadata of a file.

When the to-be-stored file is stored in the value of the target key, the to-be-stored metadata is stored in the metadata database, the fixed sub-metadata in the to-be-stored metadata is stored in the name of the target key, and the variable sub-metadata in the to-be-stored metadata is stored, as additional information, in the preset storage area corresponding to the target key. In this way, data access can be performed based on the metadata in the metadata database.

It should be noted that, regardless of whether data is stored in the name of the key and in the value of the key, the storage space occupied by the name of the key and the value of the key is fixed. Thus, a backup of fixed sub-metadata is stored in the name of the key, which does not occupy other storage space. That is, the backup of fixed sub-metadata does not occupy extra storage space, thereby saving storage space. In addition, there is a one-to-one correspondence between a key and a preset storage area. The preset storage area corresponding to the key may be located in the value of the key, or may be located in another location, which is not limited herein.

Figure 3:
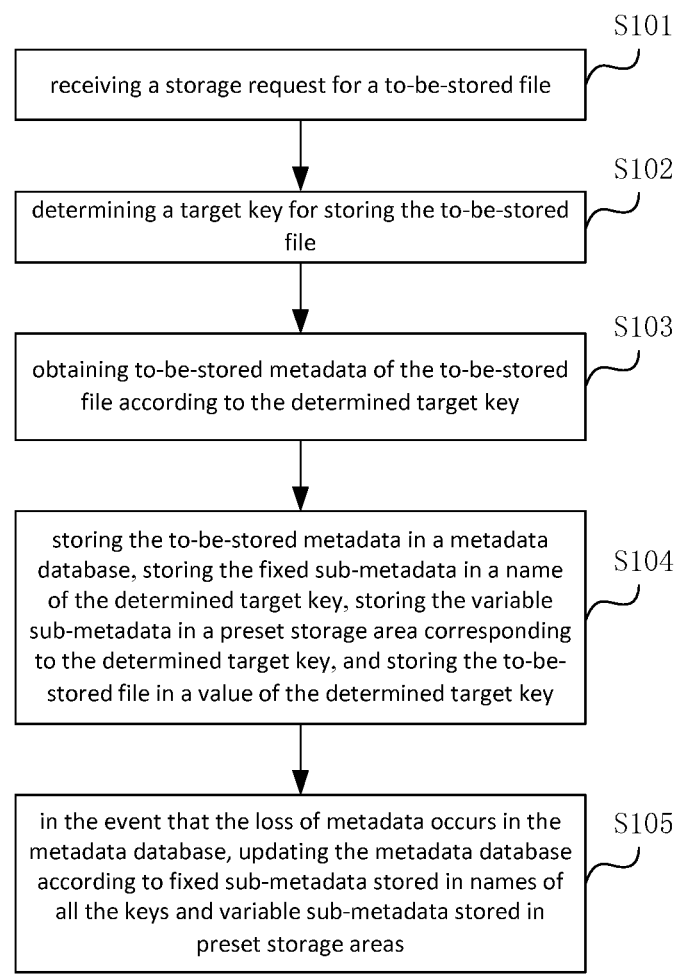
FIG. 3 is another schematic flowchart of a file storage method according to an embodiment of the present application.

In an embodiment of the present application, a loss of meta-database occurs in the metadata database. Referring to FIG. 3, based on FIG. 1, after S104, the file storage method may further include:

S105: In the event that a loss of metadata occurs in the metadata database, updating the metadata database according to the fixed sub-metadata stored in the names of all the keys and the variable sub-metadata stored in the preset storage areas.

The fixed sub-metadata in the to-be-stored metadata is stored in the name of the target key, and the variable sub-metadata in the to-be-stored metadata is stored, as additional information, in a preset storage area corresponding to the target key. In the case that the loss of metadata occurs in the metadata database, the fixed sub-metadata stored in the name of the key and the variable sub-metadata stored in the preset storage area can be obtained to form complete metadata, thereby updating the metadata database, and restoring the metadata in the metadata database.

Figure 4:
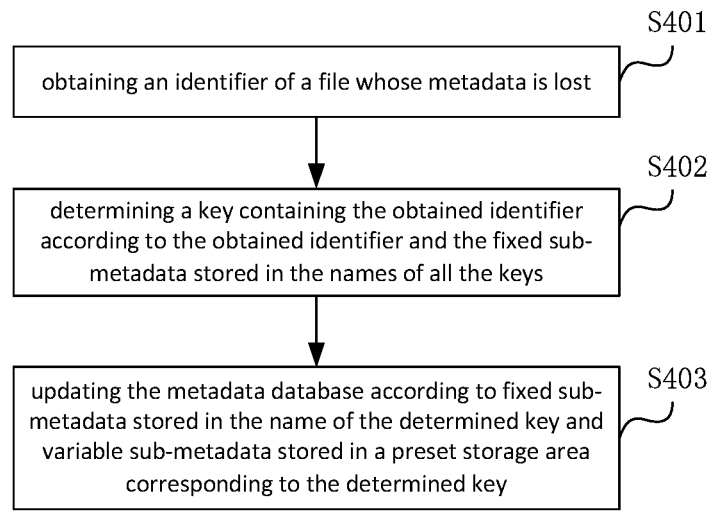
FIG. 4 is a schematic flowchart diagram of a metadata recovery method according to an embodiment of the present application.

In an implementation of the present application, only a small part of metadata in the metadata database may be lost. In this case, if all the metadata stored in the metadata database is updated, the recovery speed of the metadata is slow. Therefore, an embodiment of the present application provides a metadata recovery method. Referring to FIG. 4, based on FIG. 1, the method includes S401-S403.

S401: Obtaining an identifier of a file whose metadata is lost.

In an implementation of the present application, when a file cannot be read, it may be determined that the metadata of the file in the metadata database is lost, and thus the identifier of the file is obtained. Alternatively, the identifier of the file can be obtained from a read request for the file.

S402: Determining a key containing the obtained identifier according to the obtained identifier and the fixed sub-metadata stored in the names of all the keys.

The fixed sub-metadata contains an identifier of a file. The fixed sub-metadata stored in the names of all the keys may be read, and whether the read fixed sub-metadata contains the identifier of the file whose metadata is lost may be determined. If fixed sub-metadata stored in a name of a key contains the identifier of the file, and the key is determined to be the key containing the identifier of the file.

S403: updating the metadata database according to the fixed sub-metadata stored in the name of the determined key and the variable sub-metadata stored in the preset storage area corresponding to the determined key.

In this case, only the lost metadata in the metadata database is updated, which greatly improves the efficiency of the updating of the metadata database.

In an implementation of the present application, there may be a deletion of a file. When a large number of files are deleted, stripes for keys may be adjusted to spare some stripes, so that the spared stripes can store other files. This can be called stripe recycling. As shown in FIG. 2, if File1 and File3 are deleted, the stripe for the key of File2_1 can be changed to stripe Strip2, and Strip1 and Strip3 can be recycled. The stripe for the key of File2_1 has changed, thus the sub-metadata (variable sub-metadata) corresponding to the stripe information of File2_1 also has changed. In order to ensure that the metadata can be recovered in the case that the metadata is lost in the metadata database, the variable sub-metadata of File2_1 needs to be updated. Assuming that the stripe for the first key is recycled, the process of updating the variable sub-metadata may include:

S11. obtaining new stripe information corresponding to the first key;

S12. obtaining, according to the new stripe information, second variable sub-metadata of the file stored in the first key; and S13. updating the variable sub-metadata data stored in the preset storage area corresponding to the first key according to the second variable sub-metadata.

Here, when the stripe information corresponding to the key changes, only the variable sub-metadata stored in the preset storage area needs to be updated, and the fixed sub-metadata in the name of the key is not required to be updated. That is, the name of the key will not change. Thus, the problem of dumping due to change in the name of the key can be avoided.

Furthermore, in addition to updating the variable sub-metadata data stored in the preset storage area corresponding to the first key according to the second variable sub-metadata, the method further includes: updating the variable sub-metadata data corresponding to the first key in the metadata database according to the second variable sub-metadata, to ensure that the data stored in the keys can be read normally.

It should be noted that the foregoing step of storing the to-be-stored file may be performed while storing the to-be-stored metadata, or may be performed before storing the to-be-stored metadata but after S102, or may be performed after storing the to-be-stored metadata, which is not limited herein.

In an implementation of the present application, when the target key includes multiple keys, the naming rule of the key may be: fixed sub-metadata: [identifier of a file]_[identifier of a domain in which the file is located]_[offset of a file block stored in a value of the key relative to a file header of the file]_[data volume of the file block of the file stored in the value of the key], the variable sub-metadata: [identifier of the stripe corresponding to the key]_[serial number of the key in the stripe]. In an embodiment, according to the description in step S103, keys may be named with reference to Table 1. Table 1 is a comparison of an original name of a key with a name of a key in the embodiment of present application.

TABLE 1

| Original name of key | Name of key in embodiment of present application |
|---|---|
| key1 | [file1]_[1]_[0]_[len_in_key1] |
| key2 | [file1]_[1]_[len_in_key1]_[len_in_key2] |

The original name of the first key is key1, and the original name of the second key is key2.

Table 2 is the comparison of fixed sub-metadata and variable sub-metadata.

TABLE 2

| fixed sub-metadata | variable sub-metadata |
|---|---|
| [file1]_[1]_[0]_[len_in_key1] | [Strip1]_[1] |
| [file1]_[1]_[len_in_key1]_[len_in_key2] | [Strip2]_[3] |

In Table 1, in the name of the key of the embodiment of present application, [file1] is the identifier of the file A; [1] is the identifier of the domain in which the file A is stored, indicating that the file A is stored in the domain 1.

In the first key (the key whose original name is key1) of the embodiment of the present application, [0] is the offset of the file block stored in the value of the key relative to the file header of the file A. Since the first key stores a file block of file A from the file header of the file A, the offset of the first key is 0. [len_in_key1] represents the data volume of the file block stored in the value of the first key.

In the second key (the key whose original name is key2) of the embodiment of the present application, [len_in_key1] is the offset of the file block stored in the value of the key relative to the file header of the file A. Since the file block whose data volume is [len_in_key1] has been stored by the first key, the offset of the second key is [len_in_key1]. [len_in_key2] represents the data volume of the file block stored by the second key.

Further, the data in the name of the key in the embodiment of the present application in Table 1 corresponds to the fixed sub-metadata in Table 2. In the variable sub-metadata in Table 2, [Strip1] represents the stripe 1 and [1] represents that the first key is numbered 1 in stripe 1, [Strip2] represents stripe 2, and [3] represents that the second key is numbered 3 in stripe 2.

After the fixed sub-metadata and the variable sub-metadata are stored according to a certain naming rule, the required metadata in the meta-database can be extracted according to the naming rule. In the event that a loss of metadata occurs in the meta-database, the metadata database can be updated.

In an implementation of the present application, the file blocks are stored by the target keys sequentially in an increasing order of the offsets of the starting locations of the file blocks relative to the file header of the to-be-stored file, so as to avoid problem that a file block of the to-be-stored file fails to be successfully stored. In addition, in storing the file blocks in the target keys, the file blocks are sequentially stored by the target keys in an increasing order of physical addresses or logical addresses of the target keys, so that when the to-be-stored file is read, the file blocks of the to-be-stored file can be quickly obtained.

In addition, after the to-be-stored file is successfully stored, the metadata of the to-be-stored file is stored. In this way, the accuracy of the metadata in the metadata database is ensured, thereby avoiding the problem that the to-be-stored file is unsuccessfully stored, while the metadata of the to-be-stored file is stored, which in turn causes that the metadata in the metadata database cannot be correctly read, and a storage terminal crashes.

In the embodiments of the present application, after a storage request for a to-be-stored file is received, to-be-stored metadata of the to-be-stored file is obtained. While the to-be-stored metadata is stored in the metadata database, the fixed sub-metadata in the to-be-stored metadata is stored in the name of the determined target key, and the variable sub-metadata in the to-be-stored metadata is stored in the preset storage area corresponding to the determined target key. In this way, in the case that the loss of metadata occurs in the metadata database, the metadata in the metadata database can be recovered according to the fixed sub-metadata stored in the name of the key and the variable sub-metadata in the preset storage area corresponding to the key, thus ensuring the recovery of metadata. In addition, the fixed sub-metadata is stored in the fixed storage space occupied by the name of the key, thus the fixed sub-metadata does not occupy additional storage space, thereby saving storage space.

Corresponding to the method embodiment, an embodiment of the present application further provides a file storage device.

Figure 5:
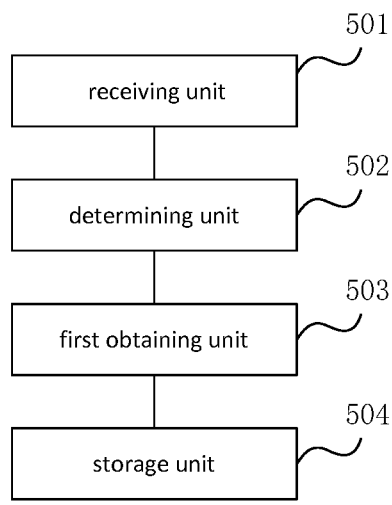
FIG. 5 is a schematic structural diagram of a file storage device according to an embodiment of the present application.

FIG. 5 is a schematic structural diagram of a file storage device according to an embodiment of the present application. The device includes:

a receiving unit 501, configured for receiving a storage request for a to-be-stored file;

a determining unit 502, configured for determining a target key for storing the to-be-stored file;

a first obtaining unit 503, configured for obtaining to-be-stored metadata of the to-be-stored file according to the determined target key, wherein the to-be-stored metadata comprises: fixed sub-metadata and variable sub-metadata; and a storage unit 504, configured for storing the to-be-stored metadata in a metadata database, storing the fixed sub-metadata in a name of the determined target key, storing the variable sub-metadata in a preset storage area corresponding to the determined target key, and storing the to-be-stored file in a value of the determined target key.

In an implementation of the present application, the device may further include:

a second obtaining unit (not shown in FIG. 5), configured for, when the determined target key is a plurality of keys, obtaining, according to the number of the determined target keys, a file block of the to-be-stored file which is to be stored by each target key, before the to-be-stored metadata of the to-be-stored file is obtained according to the determined target keys.

The first obtaining unit 503 is specifically configured for obtaining metadata of a file block to be stored by each target key, and determining the obtained metadata as to-be-stored metadata of the to-be-stored file.

In an implementation of the present application, the first obtaining unit 503 may include:

a first determining subunit (not shown in FIG. 5), configured for determining an offset of a file block to be stored by each target key relative to a file header of the to-be-stored file, and determining stripe information corresponding to each target key; and a first obtaining subunit (not shown in FIG. 5), configured for, for each target key, obtaining first fixed sub-metadata of the file block to be stored by this target key according to the offset of the file block to be stored by this target key relative to the file header of the to-be-stored file, and obtaining first variable sub-metadata of the file block to be stored by this target key according to the stripe information corresponding to this target key, wherein the first fixed sub-metadata and the first variable sub-metadata constitute the metadata of the file block to be stored by this target key.

The storage unit 504 is specifically configured for:

for each target key, storing the to-be-stored metadata in the metadata database, storing the first fixed sub-metadata in the name of this target key, storing the first variable sub-metadata in the preset storage area corresponding to this target key, and storing the to-be-stored file in the value of the determined target key.

In an implementation of the present application, the device may further include:

an updating unit (not shown in FIG. 5), configured for updating the metadata database according to fixed sub-metadata stored in names of all the keys and variable sub-metadata stored in preset storage areas, in the event that the loss of metadata occurs in the metadata database.

In an implementation of the present application, the updating unit may include:

a second obtaining subunit (not shown in FIG. 5), configured for obtaining an identifier of a file whose metadata is lost, in the event that the loss of metadata occurs in the metadata database;

a second determining subunit (not shown in FIG. 5), configured for determining a key containing the obtained identifier according to the obtained identifier and the fixed sub-metadata stored in the names of all the keys; and an updating subunit (not shown in FIG. 5), configured for updating the metadata database according to fixed sub-metadata stored in the name of the determined key and variable sub-metadata stored in a preset storage area corresponding to the determined key.

In an implementation of the present application, the device may further include:

an acquiring unit (not shown in FIG. 5), configured for acquiring new stripe information corresponding to a first key when a stripe for the first key is recycled;

a third obtaining unit (not shown in FIG. 5), configured for obtaining, according to the new stripe information, second variable sub-metadata of a file stored in the first key; and an updating unit (not shown in FIG. 5), configured for updating variable sub-metadata stored in a preset storage area corresponding to the first key according to the second variable sub-metadata.

In the embodiments of the present application, after a storage request for a to-be-stored file is received, to-be-stored metadata of the to-be-stored file is obtained. While the to-be-stored metadata is stored in the metadata database, the fixed sub-metadata in the to-be-stored metadata is stored in the name of the determined target key, and the variable sub-metadata in the to-be-stored metadata is stored in the preset storage area corresponding to the determined target key. In this way, in the case that the loss of metadata occurs in the metadata database, the metadata in the metadata database can be recovered according to the fixed sub-metadata stored in the name of the key and the variable sub-metadata in the preset storage area corresponding to the key, thus ensuring the recovery of metadata. In addition, the fixed sub-metadata is stored in the fixed storage space occupied by the name of the key, thus the fixed sub-metadata does not occupy additional storage space, thereby saving storage space.

An embodiment of the present application also provides an electronic device including a processor, a communication interface, a memory, and a communication bus. The processor, the communication interface, and the memory communicates with each other via the communication bus.

The memory is configured to store an application program.

The processor, when executing the application program stored on the memory, implements a file storage method. The file storage method includes:

receiving a storage request for a to-be-stored file;

determining a target key for storing the to-be-stored file;

obtaining to-be-stored metadata of the to-be-stored file according to the determined target key, wherein the to-be-stored metadata comprises: fixed sub-metadata and variable sub-metadata; and storing the to-be-stored metadata in a metadata database, storing the fixed sub-metadata in a name of the determined target key, storing the variable sub-metadata in a preset storage area corresponding to the determined target key, and storing the to-be-stored file in a value of the determined target key.

In an implementation of the present application, in the event that the determined target key is a plurality of keys, before obtaining the to-be-stored metadata of the to-be-stored file according to the determined target key, the method may further comprise:

obtaining, according to the number of the determined target keys, a file block of the to-be-stored file which is to be stored by each target key; and the step of obtaining to-be-stored metadata of the to-be-stored file according to the determined target key comprises:

obtaining metadata of a file block to be stored by each target key, and determining the obtained metadata as to-be-stored metadata of the to-be-stored file.

In an implementation of the present application, the step of obtaining metadata of a file block to be stored by each target key comprises:

determining an offset of a file block to be stored by each target key relative to a file header of the to-be-stored file, and determining stripe information corresponding to each target key; and for each target key, obtaining first fixed sub-metadata of the file block to be stored by this target key according to the offset of the file block to be stored by this target key relative to the file header of the to-be-stored file, and obtaining first variable sub-metadata of the file block to be stored by this target key according to the stripe information corresponding to this target key, wherein the first fixed sub-metadata and the first variable sub-metadata constitute the metadata of the file block to be stored by this target key; and the step of storing the fixed sub-metadata in the name of the determined target key and storing the variable sub-metadata in the preset storage area corresponding to the determined target key comprises:

for each target key, storing the first fixed sub-metadata in the name of this target key, and storing the first variable sub-metadata in the preset storage area corresponding to this target key.

In an implementation of the present application, after storing the to-be-stored metadata in the metadata database, storing the fixed sub-metadata in the name of the determined target key, storing the variable sub-metadata in the preset storage area corresponding to the determined target key, and storing the to-be-stored file in a value of the determined target key, the method may further comprise:

in the event that the loss of metadata occurs in the metadata database, updating the metadata database according to fixed sub-metadata stored in names of all the keys and variable sub-metadata stored in preset storage areas.

In an implementation of the present application, the step of updating the metadata database according to fixed sub-metadata stored in names of all the keys and variable sub-metadata stored in preset storage areas, comprises:

obtaining an identifier of a file whose metadata is lost;

determining a key containing the obtained identifier according to the obtained identifier and the fixed sub-metadata stored in the names of all the keys; and updating the metadata database according to fixed sub-metadata stored in the name of the determined key and variable sub-metadata stored in a preset storage area corresponding to the determined key.

In an implementation of the present application, when a stripe for a first key is recycled, the method may further include:

acquiring new stripe information corresponding to the first key;

obtaining, according to the new stripe information, second variable sub-metadata of a file stored in the first key; and updating variable sub-metadata stored in a preset storage area corresponding to the first key according to the second variable sub-metadata.

In the embodiments of the present application, after a storage request for a to-be-stored file is received, to-be-stored metadata of the to-be-stored file is obtained. While the to-be-stored metadata is stored in the metadata database, the fixed sub-metadata in the to-be-stored metadata is stored in the name of the determined target key, and the variable sub-metadata in the to-be-stored metadata is stored in the preset storage area corresponding to the determined target key. In this way, in the case that the loss of metadata occurs in the metadata database, the metadata in the metadata database can be recovered according to the fixed sub-metadata stored in the name of the key and the variable sub-metadata in the preset storage area corresponding to the key, thus ensuring the recovery of metadata. In addition, the fixed sub-metadata is stored in the fixed storage space occupied by the name of the key, thus the fixed sub-metadata does not occupy additional storage space, thereby saving storage space.

The communication bus may be a PCI (Peripheral Component Interconnect) bus or an EISA (Extended Industry Standard Architecture) bus. The communication bus can be divided into an address bus, a data bus, a control bus, and the like.

The above electronic device communicates with other devices through the communication interface.

The memory may include a RAM (Random Access Memory), and may also include an NVM (Non-Volatile Memory), such as at least one disk storage device. Optionally, the memory may also be at least one storage device located away from the aforementioned processor.

The processor may be a general-purpose processor, including a CPU (Central Processing Unit), an NP (Network Processor), or the like; or a DSP (Digital Signal Processing) or an ASIC (Application Specific Integrated Circuit), FPGA (Field-Programmable Gate Array) or other programmable logic devices, discrete gates or transistor logic devices, discrete hardware components.

An embodiment of the present application also provides an application program which implements a file storage method when being executed. The file storage method includes:

receiving a storage request for a to-be-stored file;

determining a target key for storing the to-be-stored file;

obtaining to-be-stored metadata of the to-be-stored file according to the determined target key, wherein the to-be-stored metadata comprises: fixed sub-metadata and variable sub-metadata; and storing the to-be-stored metadata in a metadata database, storing the fixed sub-metadata in a name of the determined target key, storing the variable sub-metadata in a preset storage area corresponding to the determined target key, and storing the to-be-stored file in a value of the determined target key.

In an implementation of the present application, in the event that the determined target key is a plurality of keys, before obtaining the to-be-stored metadata of the to-be-stored file according to the determined target key, the method further comprises:

obtaining, according to the number of the determined target keys, a file block of the to-be-stored file which is to be stored by each target key; and the step of obtaining to-be-stored metadata of the to-be-stored file according to the determined target key comprises:

obtaining metadata of a file block to be stored by each target key, and determining the obtained metadata as to-be-stored metadata of the to-be-stored file.

In an implementation of the present application, the step of obtaining metadata of a file block to be stored by each target key comprises:

determining an offset of a file block to be stored by each target key relative to a file header of the to-be-stored file, and determining stripe information corresponding to each target key; and for each target key, obtaining first fixed sub-metadata of the file block to be stored by this target key according to the offset of the file block to be stored by this target key relative to the file header of the to-be-stored file, and obtaining first variable sub-metadata of the file block to be stored by this target key according to the stripe information corresponding to this target key, wherein the first fixed sub-metadata and the first variable sub-metadata constitute the metadata of the file block to be stored by this target key; and the step of storing the fixed sub-metadata in the name of the determined target key and storing the variable sub-metadata in the preset storage area corresponding to the determined target key comprises:

for each target key, storing the first fixed sub-metadata in the name of this target key, and storing the first variable sub-metadata in the preset storage area corresponding to this target key.

In an implementation of the present application, after storing the to-be-stored metadata in the metadata database, storing the fixed sub-metadata in the name of the determined target key, storing the variable sub-metadata in the preset storage area corresponding to the determined target key, and storing the to-be-stored file in a value of the determined target key, the method may further comprise:

in the event that the loss of metadata occurs in the metadata database, updating the metadata database according to fixed sub-metadata stored in names of all the keys and variable sub-metadata stored in preset storage areas.

In an implementation of the present application, the step of updating the metadata database according to fixed sub-metadata stored in names of all the keys and variable sub-metadata stored in preset storage areas, comprises:

obtaining an identifier of a file whose metadata is lost;

determining a key containing the obtained identifier according to the obtained identifier and the fixed sub-metadata stored in the names of all the keys; and updating the metadata database according to fixed sub-metadata stored in the name of the determined key and variable sub-metadata stored in a preset storage area corresponding to the determined key.

In an implementation of the present application, when a stripe for a first key is recycled, the method may further include:

acquiring new stripe information corresponding to the first key;

obtaining, according to the new stripe information, second variable sub-metadata of a file stored in the first key; and updating variable sub-metadata stored in a preset storage area corresponding to the first key according to the second variable sub-metadata.

In the embodiments of the present application, after a storage request for a to-be-stored file is received, to-be-stored metadata of the to-be-stored file is obtained. While the to-be-stored metadata is stored in the metadata database, the fixed sub-metadata in the to-be-stored metadata is stored in the name of the determined target key, and the variable sub-metadata in the to-be-stored metadata is stored in the preset storage area corresponding to the determined target key. In this way, in the case that the loss of metadata occurs in the metadata database, the metadata in the metadata database can be recovered according to the fixed sub-metadata stored in the name of the key and the variable sub-metadata in the preset storage area corresponding to the key, thus ensuring the recovery of metadata. In addition, the fixed sub-metadata is stored in the fixed storage space occupied by the name of the key, thus the fixed sub-metadata does not occupy additional storage space, thereby saving storage space.

An embodiment of the present application also provides a readable storage medium for storing an application program which, when executed, implements a file storage method. The file storage method includes:

receiving a storage request for a to-be-stored file;

determining a target key for storing the to-be-stored file;

obtaining to-be-stored metadata of the to-be-stored file according to the determined target key, wherein the to-be-stored metadata comprises: fixed sub-metadata and variable sub-metadata; and storing the to-be-stored metadata in a metadata database, storing the fixed sub-metadata in a name of the determined target key, storing the variable sub-metadata in a preset storage area corresponding to the determined target key, and storing the to-be-stored file in a value of the determined target key.

In an implementation of the present application, in the event that the determined target key is a plurality of keys, before obtaining the to-be-stored metadata of the to-be-stored file according to the determined target key, the method may further comprise:

obtaining, according to the number of the determined target keys, a file block of the to-be-stored file which is to be stored by each target key; and the step of obtaining to-be-stored metadata of the to-be-stored file according to the determined target key comprises:

obtaining metadata of a file block to be stored by each target key, and determining the obtained metadata as to-be-stored metadata of the to-be-stored file.

In an implementation of the present application, the step of obtaining metadata of a file block to be stored by each target key comprises:

determining an offset of a file block to be stored by each target key relative to a file header of the to-be-stored file, and determining stripe information corresponding to each target key; and for each target key, obtaining first fixed sub-metadata of the file block to be stored by this target key according to the offset of the file block to be stored by this target key relative to the file header of the to-be-stored file, and obtaining first variable sub-metadata of the file block to be stored by this target key according to the stripe information corresponding to this target key, wherein the first fixed sub-metadata and the first variable sub-metadata constitute the metadata of the file block to be stored by this target key; and the step of storing the fixed sub-metadata in the name of the determined target key and storing the variable sub-metadata in the preset storage area corresponding to the determined target key comprises:

for each target key, storing the first fixed sub-metadata in the name of this target key, and storing the first variable sub-metadata in the preset storage area corresponding to this target key.

In an implementation of the present application, after storing the to-be-stored metadata in the metadata database, storing the fixed sub-metadata in the name of the determined target key, storing the variable sub-metadata in the preset storage area corresponding to the determined target key, and storing the to-be-stored file in a value of the determined target key, the method may further comprise:

in the event that the loss of metadata occurs in the metadata database, updating the metadata database according to fixed sub-metadata stored in names of all the keys and variable sub-metadata stored in preset storage areas.

In an implementation of the present application, the step of updating the metadata database according to fixed sub-metadata stored in names of all the keys and variable sub-metadata stored in preset storage areas, comprises:

obtaining an identifier of a file whose metadata is lost;

determining a key containing the obtained identifier according to the obtained identifier and the fixed sub-metadata stored in the names of all the keys; and updating the metadata database according to fixed sub-metadata stored in the name of the determined key and variable sub-metadata stored in a preset storage area corresponding to the determined key.

In an implementation of the present application, when a stripe for a first key is recycled, the method may further include:

acquiring new stripe information corresponding to the first key;

obtaining, according to the new stripe information, second variable sub-metadata of a file stored in the first key; and updating variable sub-metadata stored in a preset storage area corresponding to the first key according to the second variable sub-metadata.

In the embodiments of the present application, after a storage request for a to-be-stored file is received, to-be-stored metadata of the to-be-stored file is obtained. While the to-be-stored metadata is stored in the metadata database, the fixed sub-metadata in the to-be-stored metadata is stored in the name of the determined target key, and the variable sub-metadata in the to-be-stored metadata is stored in the preset storage area corresponding to the determined target key. In this way, in the case that the loss of metadata occurs in the metadata database, the metadata in the metadata database can be recovered according to the fixed sub-metadata stored in the name of the key and the variable sub-metadata in the preset storage area corresponding to the key, thus ensuring the recovery of metadata. In addition, the fixed sub-metadata is stored in the fixed storage space occupied by the name of the key, thus the fixed sub-metadata does not occupy additional storage space, thereby saving storage space.

The embodiments of the file storage device, the electronic device, the application program and the readable storage medium are described briefly since they are substantially similar to the embodiment of the method. Related contents can refer to the part that describes the embodiment of the method.

It should be noted that the relationship terms herein, such as "first," "second," and the like are only used to distinguish one entity or operation from another entity or operation, but do not necessarily require or imply that there is actual relationship or order between these entities or operations. Moreover, the terms "include," "comprise," or any variants thereof are intended to cover a non-exclusive inclusion, such that processes, methods, articles, or devices, including a series of elements, include not only those elements that have been listed, but also other elements that have not specifically been listed or the elements intrinsic to these processes, methods, articles, or devices. Without further limitations, elements limited by the wording "comprise(s) a/an . . . " and "include(s) a/an . . . " do not exclude additional identical elements in the processes, methods, articles, or devices, including the listed elements.

It can be understood by a person skilled in the art that all or a part of steps in the implementations of the above method can be accomplished by instructing related hardware through programs, which can be stored in a computer-readable storage medium, such as in ROM/RAM, a disk, an optical disk, and so on.

The embodiments described above are simply preferable embodiments of the present application, and are not intended to limit the scope of protection of the present application. Any modifications, alternatives, improvements, or the like within the spirit and principle of the present application shall be included within the scope of protection of the present application.

What is claimed is:

1. A file storage method, comprising:
receiving a storage request for a to-be-stored file;
determining a target key for storing the to-be-stored file;
obtaining to-be-stored metadata of the to-be-stored file according to the determined target key, wherein the to-be-stored metadata comprises: fixed sub-metadata and variable sub-metadata; and
storing the to-be-stored metadata in a metadata database, storing the fixed sub-metadata in a name of the determined target key, storing the variable sub-metadata in a preset storage area corresponding to the determined target key, and storing the to-be-stored file in a value of the determined target key.

2. The method according to claim 1, wherein the determined target key is a plurality of keys; before obtaining the to-be-stored metadata of the to-be-stored file according to the determined target key, the method further comprises:
obtaining, according to the number of the determined target keys, a file block of the to-be-stored file which is to be stored by each target key; and
the step of obtaining to-be-stored metadata of the to-be-stored file according to the determined target key comprises:
obtaining metadata of a file block to be stored by each target key, and determining the obtained metadata as to-be-stored metadata of the to-be-stored file.

3. The method according to claim 2, wherein, the step of obtaining metadata of a file block to be stored by each target key comprises:
determining an offset of a file block to be stored by each target key relative to a file header of the to-be-stored file, and determining stripe information corresponding to each target key; and
for each target key, obtaining first fixed sub-metadata of the file block to be stored by this target key according to the offset of the file block to be stored by this target key relative to the file header of the to-be-stored file, and obtaining first variable sub-metadata of the file block to be stored by this target key according to the stripe information corresponding to this target key, wherein the first fixed sub-metadata and the first variable sub-metadata constitute the metadata of the file block to be stored by this target key; and the step of storing the fixed sub-metadata in the name of the determined target key and storing the variable sub-metadata in the preset storage area corresponding to the determined target key comprises:

for each target key, storing the first fixed sub-metadata in the name of this target key, and storing the first variable sub-metadata in the preset storage area corresponding to this target key.

4. The method according to claim 1, wherein, after storing the to-be-stored metadata in the metadata database, storing the fixed sub-metadata in the name of the determined target key, storing the variable sub-metadata in the preset storage area corresponding to the determined target key, and storing the to-be-stored file in a value of the determined target key, the method further comprises:

in the event that the loss of metadata occurs in the metadata database, updating the metadata database according to fixed sub-metadata stored in names of all the keys and variable sub-metadata stored in preset storage areas.

5. The method according to claim 4, wherein, the step of updating the metadata database according to fixed sub-metadata stored in names of all the keys and variable sub-metadata stored in preset storage areas, comprises:

obtaining an identifier of a file whose metadata is lost;
determining a key containing the obtained identifier according to the obtained identifier and the fixed sub-metadata stored in the names of all the keys; and
updating the metadata database according to fixed sub-metadata stored in the name of the determined key and variable sub-metadata stored in a preset storage area corresponding to the determined key.

6. The method according to claim 1, wherein when a stripe for a first key is recycled, the method further includes:

acquiring new stripe information corresponding to the first key;
obtaining, according to the new stripe information, second variable sub-metadata of a file stored in the first key; and
updating variable sub-metadata stored in a preset storage area corresponding to the first key according to the second variable sub-metadata.

7. A non-transitory readable storage medium, wherein the readable storage medium is used for storing an application program which, when executed, implements the method according to claim 1.

8. A file storage device, comprising:
a receiving unit, configured for receiving a storage request for a to-be-stored file;
a determining unit, configured for determining a target key for storing the to-be-stored file;
a first obtaining unit, configured for obtaining to-be-stored metadata of the to-be-stored file according to the determined target key, wherein the to-be-stored metadata comprises: fixed sub-metadata and variable sub-metadata; and
a storage unit, configured for storing the to-be-stored metadata in a metadata database, storing the fixed sub-metadata in a name of the determined target key, storing the variable sub-metadata in a preset storage area corresponding to the determined target key, and storing the to-be-stored file in a value of the determined target key.

9. The device according to claim 8, wherein, the device further comprises:
a second obtaining unit, configured for, in the event that the determined target key is a plurality of keys, obtaining, according to the number of the determined target keys, a file block of the to-be-stored file which is to be stored by each target key, before the to-be-stored metadata of the to-be-stored file is obtained according to the determined target keys; and
the first obtaining unit is further configured for:
obtaining metadata of a file block to be stored by each target key, and determining the obtained metadata as to-be-stored metadata of the to-be-stored file.

10. The device according to claim 9, wherein the first obtaining unit comprises:
a first determining subunit, configured for determining an offset of a file block to be stored by each target key relative to a file header of the to-be-stored file, and determining stripe information corresponding to each target key; and
a first obtaining subunit, configured for, for each target key, obtaining first fixed sub-metadata of the file block to be stored by this target key according to the offset of the file block to be stored by this target key relative to the file header of the to-be-stored file, and obtaining first variable sub-metadata of the file block to be stored by this target key according to the stripe information corresponding to this target key, wherein the first fixed sub-metadata and the first variable sub-metadata constitute the metadata of the file block to be stored by this target key; and
the storage unit is further configured for:
for each target key, storing the to-be-stored metadata in the metadata database, storing the first fixed sub-metadata in the name of this target key, storing the first variable sub-metadata in the preset storage area corresponding to this target key, and storing the to-be-stored file in the value of the this target key.

11. The device according to claim 8, further comprising:
an updating unit, configured for updating the metadata database according to fixed sub-metadata stored in names of all the keys and variable sub-metadata stored in preset storage areas, in the event that the loss of metadata occurs in the metadata database.

12. The device according to claim 11, wherein, the updating unit comprises:
a second obtaining subunit, configured for obtaining an identifier of a file whose metadata is lost, in the event that the loss of metadata occurs in the metadata database;
a second determining subunit, configured for determining a key containing the obtained identifier according to the obtained identifier and the fixed sub-metadata stored in the names of all the keys; and
an updating subunit, configured for updating the metadata database according to fixed sub-metadata stored in the name of the determined key and variable sub-metadata stored in a preset storage area corresponding to the determined key.

13. The device according to claim 8, further comprising:
an acquiring unit, configured for acquiring new stripe information corresponding to a first key when a stripe for the first key is recycled;
a third obtaining unit, configured for obtaining, according to the new stripe information, second variable sub-metadata of a file stored in the first key; and an updating unit, configured for updating variable submetadata stored in a preset storage area corresponding to the first key according to the second variable submetadata.

14. An electronic device, comprising a processor, a communication interface, a memory, and a communication bus, wherein the processor, the communication interface, and the memory communicates with each other via the communication bus;
    the memory is configured to store an application program; and
    the processor, when executing the application program stored on the memory, implements the method according to claim 1.

\* \* \* \* \*